(12) United States Patent
Crosby et al.

(10) Patent No.: US 10,150,892 B2
(45) Date of Patent: *Dec. 11, 2018

(54) HIGH CAPACITY EASY RELEASE EXTENDED USE ADHESIVE DEVICES

(71) Applicant: University of Massachusetts, Boston, MA (US)

(72) Inventors: Alfred J. Crosby, Amherst, MA (US); Michael D. Bartlett, Amherst, MA (US); Andrew B. Croll, West Fargo, ND (US); Daniel King, Sunderland, MA (US)

(73) Assignee: University of Massachusetts, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/411,734

(22) Filed: Jan. 20, 2017

(65) Prior Publication Data

US 2017/0306189 A1    Oct. 26, 2017

Related U.S. Application Data

(63) Continuation of application No. 13/878,405, filed as application No. PCT/US2011/057309 on Oct. 21, 2011, now Pat. No. 9,574,113.

(Continued)

(51) Int. Cl.
*C09D 5/20* (2006.01)
*C09J 7/04* (2006.01)
(Continued)

(52) U.S. Cl.
CPC ........... *C09J 7/048* (2013.01); *A44B 18/0069* (2013.01); *B32B 7/00* (2013.01); *B32B 37/12* (2013.01);
(Continued)

(58) Field of Classification Search
CPC ... B32B 37/16; B32B 37/12; B32B 2307/748; B32B 5/02; B32B 7/00; C09J 7/00;
(Continued)

(56) References Cited

U.S. PATENT DOCUMENTS 1,739,296 A    10/1929    Du Pont
4,357,198 A    11/1982    Ezquerro
(Continued)

FOREIGN PATENT DOCUMENTS

CN    1284983 A    2/2001
CN    1508204 A    6/2004
(Continued)

OTHER PUBLICATIONS

International Search Report and Written Opinion dated Jul. 31, 2012 in connection with Application No. PCT/US2011/057309.
(Continued)

*Primary Examiner* — David Sample
*Assistant Examiner* — Donald M Flores, Jr.
(74) *Attorney, Agent, or Firm* — Wolf, Greenfield & Sacks, P.C.

(57) ABSTRACT

The invention provides novel devices, systems, designs, materials and fabrication methods that enable high-load capacity, easy release, and suitable for extended/repeated use in a variety of applications.

13 Claims, 18 Drawing Sheets

Related U.S. Application Data

(60) Provisional application No. 61/405,544, filed on Oct. 21, 2010.

(51) Int. Cl.
| | |
|---|---|
| *A44B 18/00* | (2006.01) |
| *C09J 7/30* | (2018.01) |
| *C09J 7/00* | (2018.01) |
| *B32B 37/12* | (2006.01) |
| *B32B 37/16* | (2006.01) |
| *B32B 7/00* | (2006.01) |
| *C09J 7/38* | (2018.01) |
| *C09J 7/21* | (2018.01) |
| *C09J 175/04* | (2006.01) |
| *B32B 5/02* | (2006.01) |

(52) U.S. Cl.
CPC ............... *B32B 37/16* (2013.01); *C09D 5/20* (2013.01); *C09J 7/00* (2013.01); *C09J 7/21* (2018.01); *C09J 7/30* (2018.01); *C09J 7/38* (2018.01); *B32B 5/02* (2013.01); *B32B 2307/748* (2013.01); *C09J 175/04* (2013.01); *C09J 2201/28* (2013.01); *C09J 2201/622* (2013.01); *C09J 2400/263* (2013.01); *C09J 2427/001* (2013.01); *C09J 2427/006* (2013.01); *C09J 2433/00* (2013.01); *C09J 2475/00* (2013.01); *C09J 2483/00* (2013.01); *C09J 2483/006* (2013.01); *Y10T 24/33* (2015.01); *Y10T 428/2481* (2015.01); *Y10T 428/24612* (2015.01); *Y10T 428/2848* (2015.01)

(58) Field of Classification Search
CPC ......... C09J 7/30; C09J 7/38; C09J 7/21; C09J 2427/006; C09J 175/04; C09J 2483/006; C09J 2427/001; C09J 2433/00; C09J 2475/00; C09J 2483/00; C09J 2201/28; C09J 2400/263; C09J 2201/622; A44B 18/0069; C09D 5/20; Y10T 428/24612; Y10T 428/2848; Y10T 428/2481; Y10T 24/33
See application file for complete search history.

(56) References Cited

U.S. PATENT DOCUMENTS

| | | | |
|---|---|---|---|
| 4,851,076 A | 7/1989 | Manusch et al. | |
| 4,915,768 A | 4/1990 | Soderberg | |
| 4,926,526 A | 5/1990 | Brown et al. | |
| 4,967,740 A | 11/1990 | Riedel | |
| 5,049,416 A | 9/1991 | Wilczynski | |
| 5,269,871 A | 12/1993 | Longwoth et al. | |
| 5,516,581 A | 5/1996 | Kreckel et al. | |
| 5,747,131 A | 5/1998 | Kreckel | |
| 5,865,945 A | 2/1999 | McConaughy | |
| 6,045,642 A | 4/2000 | Takeuchi et al. | |
| 6,120,867 A | 9/2000 | Hamerski et al. | |
| 6,302,177 B1 | 10/2001 | Gruber | |
| 6,403,206 B1 | 6/2002 | Bries et al. | |
| 6,558,789 B1 | 5/2003 | Hamerski et al. | |
| 6,569,521 B1 | 5/2003 | Sheridan et al. | |
| 6,572,945 B2 | 6/2003 | Bries et al. | |
| 6,737,160 B1 | 5/2004 | Full et al. | |
| 6,872,439 B2 | 3/2005 | Fearing et al. | |
| 6,913,075 B1 | 7/2005 | Knowles et al. | |
| 7,011,723 B2 | 3/2006 | Full et al. | |
| 7,056,409 B2 | 6/2006 | Dubrow | |
| 7,066,182 B1 | 6/2006 | Dunshee | |
| 7,132,161 B2 | 11/2006 | Knowles et al. | |
| 7,144,624 B2 | 12/2006 | Knowles et al. | |
| 7,175,723 B2 | 2/2007 | Jones et al. | |
| 7,181,811 B1 | 2/2007 | Tomanek et al. | |
| 7,229,685 B2 | 6/2007 | Full et al. | |
| 7,762,362 B2 | 7/2010 | Cutkosky et al. | |
| 7,780,810 B2 | 8/2010 | Hamano | |
| 8,108,974 B2 | 2/2012 | Graf | |
| 8,557,378 B2 | 10/2013 | Yamanaka et al. | |
| 9,182,075 B2 | 11/2015 | Crosby et al. | |
| 9,395,038 B2 | 7/2016 | Crosby et al. | |
| 9,440,416 B2 | 9/2016 | Crosby et al. | |
| 9,574,113 B2* | 2/2017 | Crosby ............... | C09D 5/20 |
| 9,603,419 B2 | 3/2017 | Crosby et al. | |
| 2002/0095130 A1 | 7/2002 | Seitter et al. | |
| 2003/0038408 A1 | 2/2003 | Schulte | |
| 2003/0124312 A1 | 7/2003 | Autumn | |
| 2003/0134112 A1 | 7/2003 | Kreckel et al. | |
| 2004/0009353 A1 | 1/2004 | Knowles et al. | |
| 2004/0046094 A1 | 3/2004 | Lan | |
| 2004/0076822 A1 | 4/2004 | Jagota et al. | |
| 2005/0112366 A1 | 5/2005 | Pitzen | |
| 2005/0119640 A1 | 6/2005 | Sverduk et al. | |
| 2005/0148984 A1 | 7/2005 | Lindsay et al. | |
| 2005/0158567 A1* | 7/2005 | Carper ............... | B32B 7/10 428/483 |
| 2005/0181170 A1 | 8/2005 | Fearing et al. | |
| 2006/0078725 A1 | 4/2006 | Fearing et al. | |
| 2006/0202355 A1 | 9/2006 | Majidi et al. | |
| 2007/0289786 A1 | 12/2007 | Cutkosky et al. | |
| 2008/0025822 A1 | 1/2008 | Kim et al. | |
| 2008/0164080 A1 | 7/2008 | Asbeck et al. | |
| 2009/0106951 A1 | 4/2009 | Edwards et al. | |
| 2010/0038502 A1 | 2/2010 | Lan | |
| 2010/0044491 A1 | 2/2010 | Ritchey et al. | |
| 2010/0136281 A1 | 6/2010 | Sitti et al. | |
| 2010/0175836 A1 | 7/2010 | Lam | |
| 2010/0221496 A1 | 9/2010 | de Jong | |
| 2012/0216949 A1 | 8/2012 | Carey Stachowski et al. | |
| 2014/0030490 A1 | 1/2014 | Crosby et al. | |
| 2014/0304953 A1 | 10/2014 | Crosby et al. | |
| 2014/0305569 A1 | 10/2014 | Crosby et al. | |
| 2014/0312188 A1 | 10/2014 | Crosby et al. | |
| 2014/0352881 A1 | 12/2014 | Crosby et al. | |
| 2016/0102804 A1 | 4/2016 | Crosby et al. | |
| 2016/0333228 A1 | 11/2016 | Crosby et al. | |
| 2016/0375654 A1 | 12/2016 | Crosby et al. | |
| 2017/0238660 A1 | 8/2017 | Crosby et al. | |

FOREIGN PATENT DOCUMENTS

| | | | |
|---|---|---|---|
| CN | 1985288 A | 6/2007 | |
| CN | 101528169 A | 9/2009 | |
| CN | 2013-56127 Y | 12/2009 | |
| DE | 4339604 A1 | 5/1995 | |
| DE | 20-2010-014239 U2 | 12/2010 | |
| EP | 1 710 286 A1 | 10/2006 | |
| EP | 1710287 A2 | 10/2006 | |
| EP | 2522498 A1 | 11/2012 | |
| GB | 2116253 A * | 9/1983 | ............... C09J 7/20 |
| JP | 55-52721 A | 4/1980 | |
| JP | 2001-104118 A | 4/2001 | |
| JP | 2002-501107 A | 1/2002 | |
| JP | 2005-298641 A | 10/2005 | |
| RU | 2 381 969 C2 | 2/2010 | |
| RU | 111 405 U1 | 12/2011 | |
| WO | WO 95/06691 A1 | 3/1995 | |
| WO | WO 1999/055791 A1 | 11/1999 | |
| WO | WO 2008/019994 A1 | 1/2008 | |
| WO | WO 2008/028120 A1 | 3/2008 | |
| WO | WO 2011/019511 A2 | 2/2011 | |
| WO | WO 2012/078249 A2 | 6/2012 | |

OTHER PUBLICATIONS

International Preliminary Report on Patentability dated May 2, 2013 in connection with Application No. PCT/US2011/057309.
International Search Report and Written Opinion dated Apr. 25, 2013 in connection with Application No. PCT/US2013/021846.
International Preliminary Report on Patentability dated Jul. 31, 2014 in connection with Application No. PCT/US2013/021846.

(56) References Cited

OTHER PUBLICATIONS

Extended European Search Report dated Aug. 11, 2015 in connection with Application No. 13738720.5.
International Search Report dated Aug. 28, 2014 in connection with Application No. PCT/US2014/027392.
International Preliminary Report on Patentability dated Sep. 24, 2015 in connection with Application No. PCT/US2014/027392.
International Search Report dated May 22, 2014 in connection with Application No. PCT/US2014/014755.
International Preliminary Report on Patentability dated Aug. 20, 2015 in connection with Application No. PCT/US2014/014755.
International Search Report and Written Opinion dated Aug. 28, 2014 in connection with Application No. PCT/US2014/028422.
International Preliminary Report on Patentability dated Sep. 24, 2015 in connection with Application No. PCT/US2014/028422.
No Author Listed, Database WPI Week 201002. Thomson Scientific, London, GB. 2009:XP002742926:1 page.

Bartlett et al., Draping polymer adhesives. Polymer Science and Engineering, University of Massachusetts Amherst Gecko Workshop. Jul. 2010: 1 page.
Bartlett et al., Looking beyond fibrillar features to scale gecko-like adhesion. Adv Mater. 2012;24:1078-1083.
Boesel et al., Gecko-inspired surfaces: a path to strong and reversible dry adhesives. Adv Mater. May 18, 2010;22(19):2125-37. doi: 10.1002/adma.200903200.
Chan et al., Designing model systems for enhanced adhesion. MRS Bulletin. Jun. 2007;32(6):496-503.
Creton et al., Materials science of adhesives: how to bond things together. MRS Bulletin. Jun. 2003;28(6):419-423.
Creton, Pressure-sensitive adhesives: an introductory course. MRS Bulletin. Jun. 2003;28(6):434-439.
Creton et al., Sticky feet: from animals to materials. MRS Bulletin. Jun. 2007;32(6):466-472.
Crosby et al., Adhesive failure analysis of pressure-sensitive adhesives. J Poly Sci Part B: Poly Phys. Dec. 1999;37(24):3455-3472.

\* cited by examiner $$F_C = \sqrt{G_C}\sqrt{\frac{A}{C}}$$

$$C_{post} = \frac{4}{3\mu}\frac{t^3}{bh^3}$$

Add elements by the rules of compliance addition $$F_c = \sqrt{G_c}\sqrt{\frac{(b_1h_1+b_2h_2+b_3h_3+\cdots)}{C_1C_2C_3\cdots/(C_1C_2\cdots+C_2C_3\cdots+C_1C_3+\cdots)}}$$

$$= N\sqrt{G_c}\sqrt{\frac{bh}{C}}$$

(All data obtained with T-Pad)

T Pad Device

A

B

C

HIGH CAPACITY EASY RELEASE EXTENDED USE ADHESIVE DEVICES

RELATED APPLICATIONS

This application is a continuation and claims the benefit under 35 U.S.C. § 120 of U.S. application Ser. No. 13/878, 405 filed on Jun. 24, 2013, which is a National Stage of PCT/US2011/057309 filed Oct. 21, 2011, which claims the benefit of priority under 35 U.S.C. § 119(e) to U.S. Provisional Application Ser. No. 61/405,544 filed Oct. 21, 2010, each of which is herein incorporated by reference in its entirety.

GOVERNMENT RIGHTS

The United States Government has certain rights to the invention pursuant to Grant No. N66001-08-C-2054 from the Department of Navy to the University of Massachusetts.

TECHNICAL FIELD OF THE INVENTION

The invention generally relates to designs, devices, materials and methods useful for weight-bearing. More particularly, the invention relates to designs, devices, systems, materials and fabrication methods that provide adhesive devices that are high-load bearing, easy release, and suitable for extended/repeated use in a variety of applications.

BACKGROUND OF THE INVENTION

Adhesive materials that can support high capacity loads have traditionally been sought. Pressure sensitive adhesives (PSAs) are self-adhesives that form a bond when pressure is applied to marry the adhesive with the adherend. Typically, no solvent, water, or heat is necessary to activate or stimulate the adhesive to perform. Conventional PSAs have found use in pressure sensitive tapes, labels, note pads, automobile interior trims, and a wide variety of other products. There has been continued effort among the scientific community to create and produce synthetic materials and devices that mimic the performance of animals, such as geckos, in Nature.

PSAs typically rely on ubiquitous surface force interactions, such as van der Waals forces, to transfer stress across an interface. Pressure sensitive adhesives can adhere to a surface because the adhesive is soft enough to flow, or wet, the adherend. The adhesive needs to be hard enough to resist flow when stress is applied to the bond at the interface. PSAs exhibit viscoelastic (viscous and elastic) properties, both of which may be used for creating proper bonding.

Currently, PSAs are mainly fabricated from soft, viscoelastic polymer materials (e.g., coatings), which are used either independently or in conjunction with a backing material, such as a stiff film or cloth. To control the level of adhesion, PSAs alter their bulk properties by relying upon a complex formulation of both elastic and viscoelastic components to delicately balance the ability of a material to form an interface (or "wet a surface") and the resistance to separation once the interface is formed. (Benedek, et al. Eds. 2009 *Handbook of Pressure Sensitive Adhesives and Products Series*, CRC Press: Boca Raton; Pocius, 2002, *Adhesion and Adhesives Technology: An Introduction*, Hanser Publ.: Munich; Crosby, et al. 1999 *J. Poly. Sci. Part B: Polym. Phys.* 37, 24, 3455-3472; Creton, 2003 "*Materials Science of Adhesives: How to Bond Things Together.*" *MRS Bulletin* 28, 6, 419-421; Creton, 2003 "*Pressure-sensitive adhesives: An introductory course.*" *MRS Bulletin* 28, 6, 434-439; Creton, et al. 2007 "*Sticky Feet: From Animals to Materials*", *MRS Bulletin* 32, 6, all pages; Chan, et al. 2007 "*Designing Model Systems for Enhanced Adhesion.*" *MRS Bulletin* 32, 6, 496-503; Boesel, et al. 2010 *Advanced Materials* 22, 19, 2125-2137.)

Among the various aspects of PSA designs, three factors are typically relevant and emphasized: (1) Conventional PSAs are viscoelastic to allow the polymer coating to conform easily with rough a surface while dissipating mechanical energy (i.e., pressure) that is required for conformality; (2) A measure for strong PSA materials is tack energy, which is the total energy dissipated during the separation of a PSA/substrate interface; (3) High tack PSAs are typically not conducive to multiple loading applications due to the irreversible (i.e. inelastic) materials processes that are used to produce high levels of tack.

To develop adhesive material systems that overcome some of the disadvantages of conventional PSAs, much research has focused on the development of gecko-like adhesive systems. Some key attributes of both conventional PSAs and ideal gecko-like adhesives are provided in the following table:

| Property | Conventional PSA | Ideal "Gecko-Like" Adhesive |
| --- | --- | --- |
| Max Shear Stress | High | High |
| Max Normal Stress | High | High |
| Peel Resistance | High | Low (after reaching critical peel angle) |
| Energy of Separation | High | Low |
| Reversibility | Limited to None | High |
| Time/Temp Dependence | High | Unknown |
| Impact of Fouling | High | Limited |

Additionally, the adhesive surface of geckos, and similar examples in Nature, is commonly described as "dry", i.e., that adhesion does not rely upon liquid interactions, liquid-to-solid transitions like an epoxy, nor does the adhesive surface feel "tacky" to the touch like a conventional viscoelastic adhesive. Although such attributes are known and displayed in Nature, the primary design factors or mechanisms that permit good control of properties is not known and remains the subject of current research projects worldwide. To our knowledge, the development of a synthetic analog to a gecko-like adhesive has not been demonstrated, in particular one that could be used on macroscopic length scales.

There is a significant and ongoing need for designs, systems, devices, materials and related fabrication methods for adhesive systems that can be used to easily attach and support high capacity loads, yet provide simple, non-damaging release and repeated use while being cost-effective to produce.

SUMMARY OF THE INVENTION

The invention provides unique releasable adhesive devices that are useful for attachment to various surfaces and allow significant weight bearing. The materials, designs, systems, and related methods of fabrication and production disclosed herein provide adhesive devices that have high load capacity, are reusable, easy release and suitable for extended and repeated use. Attachment pads disclosed herein can be designed, for example, to fit a number of applications ranging from household weight-bearing shelves and holders, components for indoor and outdoor climbing devices, components for transportation, athletic equipment, labels and advertising posts, automobile interior trims, permanent or reversible fasteners, as well as instruments and devices for industrial, commercial, medical or military settings.

In one aspect, the invention generally relates to a releasable, surface-adhesive device. The device includes an adhesive pad and a tether component attached to the adhesive pad. The adhesive pad includes: a planar backing layer having high in-plane stiffness; and a planar layer of an elastic material having an adhesive surface on at least one side for adhering to a target surface, wherein the elastic material is impregnated onto the backing layer on at least the side opposing the adhesive surface. In certain preferred embodiment, the device further comprises a holding component for load bearing. The holding component being attachable to the tether component for connecting an object to the device.

In another aspect, the invention generally relates to a releasable, surface-adhesive device. The device includes: a planar layer comprising an elastic material and having on one side an adhesive surface for adhering to a target surface and on the other side a backing layer having high in-plane stiffness, wherein the elastic material impregnating into the fabric backing layer; and a holding component attachable to the backing layer for connecting an object to the device. A portion of the backing layer extends beyond the layer of the elastic material to form an area of the backing layer un-impregnated with the elastic material, and the holding component attaches to the backing layer at such area of the backing layer un-impregnated with the elastic material.

In yet another aspect, the invention generally relates to a releasable, reusable surface-adhesive device. The device includes an adhesive pad that has a planar layer of an elastic material having an adhesive surface on one side for adhering to a target surface; and a planar backing layer having high in-plane stiffness, wherein the backing layer is impregnated onto the layer of the elastic material on the side opposing the smooth adhesive surface. The device further includes a tether attached to the adhesive pad substantially at the center of the adhesive pad and allowing adjustment of the angle between the tether and the adhesive pad from about 0° to about 359°.

In yet another aspect, the invention generally relates to a releasable, surface-adhesive device. The device includes an adhesive pad, which has a planar layer of an elastic material having a microscopically smooth or patterned adhesive surface on one side for adhering to a target surface; and a planar backing layer having high in-plane stiffness, wherein the backing layer is impregnated onto the layer of the elastic material on the side opposing the smooth adhesive surface. The device further includes a tether component attached to the adhesive pad; and a holding component for load bearing. The holding component is attachable to the tether component for connecting an object to the device.

In yet another aspect, the invention generally relates to a method for releasably holding a weight on a surface. The method includes: (a) providing a releasable, surface-adhesive device having an adhesive pad comprising a planar layer of an elastic material having a microscopically smooth adhesive surface on one side for adhering to a target surface; and a planar fabric backing layer having high in-plane stiffness, wherein the fabric backing layer is impregnated onto the layer of the elastic material on the side opposing the smooth surface; a fabric tether attached to the adhesive pad; and a holding component for load bearing attachable to the fabric tether for connecting an object to the device; and (b) attaching the weight to the holding component.

In yet another aspect, the invention relates to a method for making a releasable, surface-adhesive device. The method includes: (a) providing an elastic material; (b) providing a fabric backing sheet; (c) curing the elastic material to impregnate the elastic material into at least a portion of the fabric backing sheet to form a pad having a layer of the elastic material with a smooth adhesive surface; (d) attaching a weight-holding component to the fabric backing sheet. The elastic material has an elasticity from about 0.05 MPa to about 50 MPa, and the layer of the elastic material has a thickness from about 0.0001 cm to about 0.1 cm.

In yet another aspect, the invention generally relates to a method for making a releasable, surface-adhesive device. The method includes: (a) providing a fabric backing sheet, on one side of which is placed a substrate layer; (b) providing, on the other side of the fabric backing sheet, a spacer-defined molding area; (c) adding an elastic material into the spacer-defined molding area of the fabric backing sheet; (d) covering the elastic material with a top cover having a microscopically smooth or patterned surface; (e) applying pressure against the top cover causing an intimate interface between the top pad and the elastic material; (f) curing the elastic material to impregnate the elastic material into at least a portion of the fabric backing sheet to form a pad having a layer of the elastic material with a microscopically smooth or patterned adhesive surface; and (g) attaching a weight-holding component to the fabric backing sheet. The elastic material has an elasticity from about 0.05 MPa to about 50 MPa, and the layer of the elastic material has a thickness from about 0.0001 cm to about 0.1 cm.

DETAILED DESCRIPTION OF THE INVENTION

The invention is based in part on the discovery of novel designs, systems, devices, and associated materials and methods of fabrication, which enable large contact surfaces, high-load capacity, easy release, extended use, and repeated use. More particularly, the present invention provides a unique, previously unknown approach to adhesive systems, which is distinctive from conventional PSA systems and the more recently explored gecko-like adhesives.

The invention differs from prior art in the field of PSAs at least in that the present invention does not rely on viscoelastic properties to achieve performance controls, as do PSAs. Designs and systems of the invention allow separation time and energy to be minimized, while maintaining the ability to support extremely high-weight loads. Large areas of interfacial contact can be designed through the combined properties of the soft elastic layer and the "draping" characteristics of a fabric layer. Furthermore, the elastic design provides a mechanism for repeated attachment and separation cycles without degradation in the load bearing capacity of the adhesive interface.

In contrast to prior art in the development of gecko-type adhesives, the designs, systems and methods disclosed herein do not require the use of surface fibrillar structures to achieve desired attributes. Following the principles disclosed herein, one may mimic the engineering design of the toe and leg structures of common examples in Nature, such as geckos in vertical climbing.

Other key differences between the present invention and the prior art relate to, among others, the specific designation of rotational freedom at continuous junctions, specifications of stiffness in loading direction with low flexural rigidity perpendicular to surface of elastic material, and the ability to achieve high capacity load support under both normal and shear loading directions with near-zero required "pre-load" (referring to the amount of force that is required to establish the adhesive/substrate interface for supporting a given load).

Figure 1:
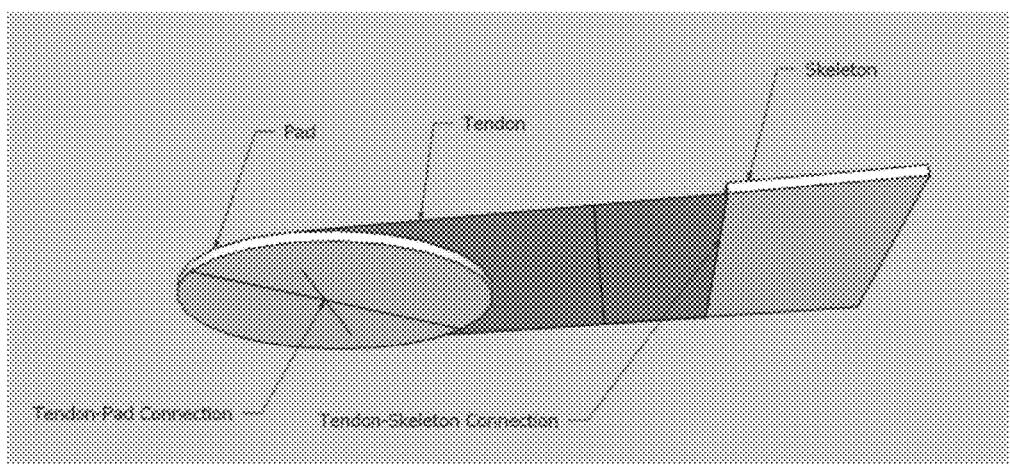
FIG. 1 shows a schematic illustration of an exemplary embodiment of the invention.

In one approach of the invention, the adhesive pad system disclosed herein employs a "dry" adhesive pad structure, sometimes referred to as a "T-pad", an embodiment of which is schematically illustrated in FIG. 1. Properly designed, the T-pad device can support high loads under shear, normal, and multi-mode (i.e. peel) loadings while requiring minimal forces and energy for release (or separation) under specifically-designed release strategies.

The basic structure of the adhesive device is referred to as the "pad", which is subsequently connected to a tether (e.g., a synthetic fabric tether), which may be referred to as the "tendon". The tether should maintain high stiffness along the primary axis of loading. The connection between the tendon and the pad has pre-defined dimensions, orientation, and spatial location, according to particular needs, that can be modified to control the release strategy and provide tolerated balance of shear and normal loading.

Figure 2:
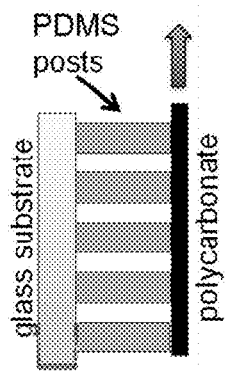
FIG. 2 shows certain design factors and schematic illustrations.
Figure 2:
Figure 2:
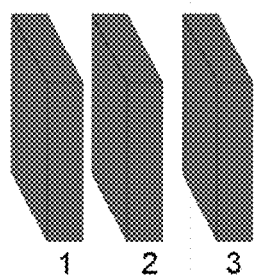
Figure 3:
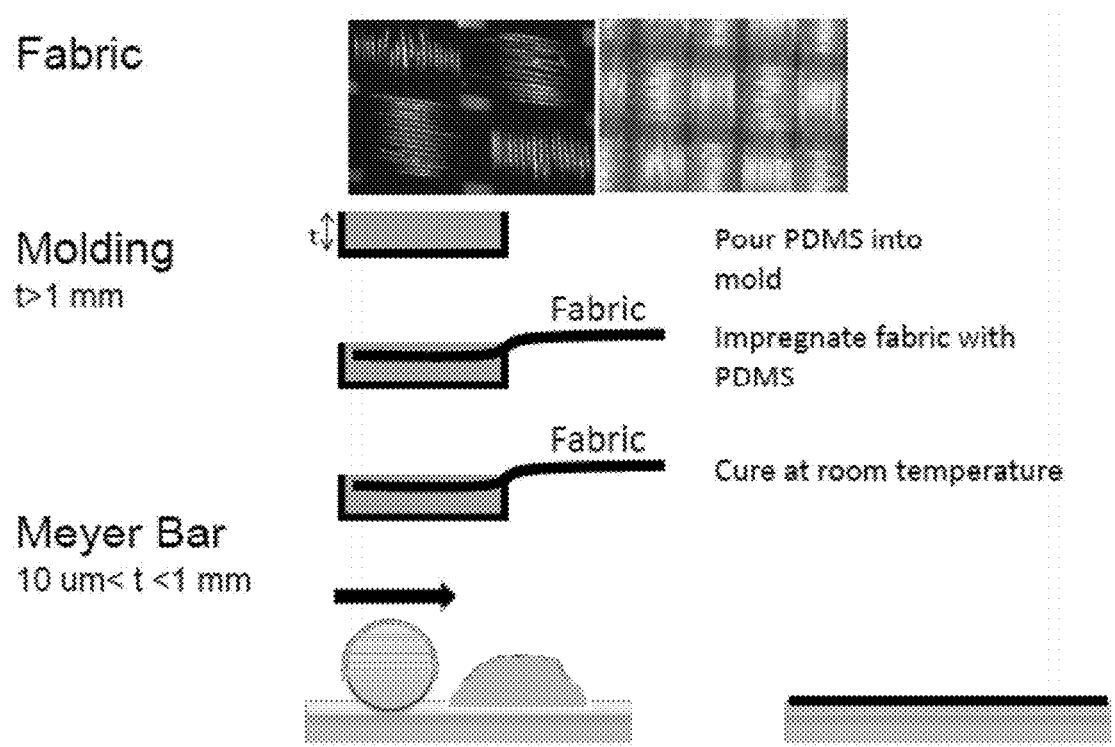
FIG. 3 shows a schematic illustration of an exemplary fabrication process.

This approach represents a unique combination of adhesion attributes of polymer materials and integrated mechanical designs through proper conservation of rotational freedom, low flexural modulus normal to the adhesive interface, and high stiffness in load bearing directions. A scaling relationship has been developed by the inventors to provide a framework for understanding the adhesive performance of the materials devices over a range of size scales and geometries (FIG. 2). This scaling relationship suggests that the adhesive capacity ($F_C$) of an interface is governed by three simple parameters, which are dependent on both the geometry and material properties of the interface. To design reversible adhesives which can adhere to various substrates, the interfacial interactions ($G_C$) should rely upon non-specific van der Waals forces, rendering $G_C$ an ineffective control parameter. Therefore, to scale $F_C$ for adhesive materials the material system must not just rely on area on contact (A) or the system compliance (C) but must develop attributes that increase the A/C ratio. This presents a challenge; materials must be soft to increase true contact but stiff to achieve high loads. Soft materials are able to create large-scale contact but have a high compliance when loaded, while stiff materials are unable to create extensive contact; both cases result in a null effect on the A/C ratio. The current invention provides a mechanism for maximizing A/C, and most importantly, tuning this governing parameter for different applications. As schematically illustrated in FIG. 3, an efficient and effective fabrication method may be used to fabricate the T-pad. The method involves integrating a thin layer of an elastic elastomer into a surface of a fabric.

The tether (tendon) can be connected to the pad through any suitable methods, such as conventional sewing, stitching, or gluing, which allows easy control of dimensional, orientational, and spatial location of the attachment. The attachment should provide sufficient load sharing and load bearing capacity, which can be controlled through the stitching pattern, width, and length. Appropriate stitching patterns include straight stitching, zigzag stitching, multi zigzag stitch, satin stitching, honeycomb stitching, ladder stitch, double overlock stitch, and criss-cross stitching.

For example, a particularly advantageous tether-pad connection is a straight-line stitch that is centered on the one axis of the pad and extends to a length of approximately ⅔ the chord length perpendicular the second pad axis. The tether-pad connection should maintain rotational freedom while maintaining high stiffness in the direction of loading. The tether-pad connection should preferably maintain equal load sharing along the entire length of the connection. At a distance sufficiently far from the tether-pad connection, the tether is integrated into a load bearing material that has high flexural rigidity and in-plane stiffness. This rigid terminal material is sometimes referred to as the "skeleton" (the "holding component"). The connection between the tether-skeleton should preferably be continuous to ensure equal load sharing along the length of the connection.

The invention includes the designs where one T-pad structure can act independently or in conjunction with an array of T-pad structures or units (referred to as a "T-surface"), which may be mounted with rotationally-free joints to a supporting substrate that can be rigid in one or more directions, for example. For certain applications, e.g., a large weight bearing shelf, multiple attachment points for the tether to the adhesive pad may also be employed.

Figure 4:
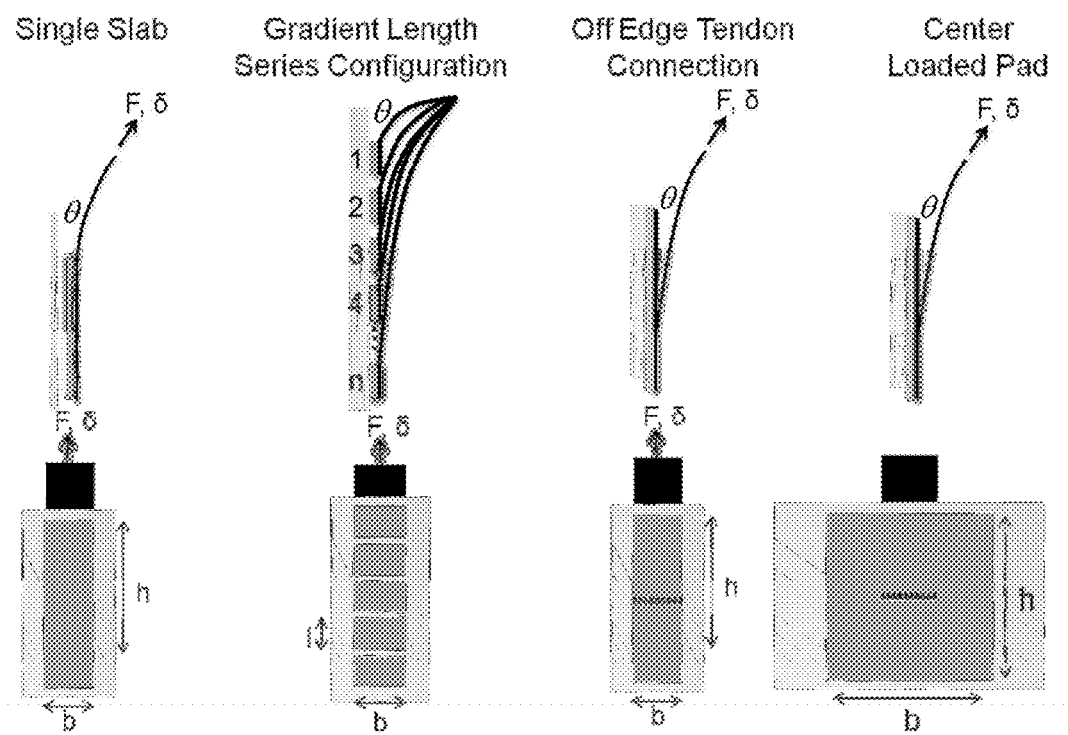
FIG. 4 shows schematic illustrations of various embodiments of the invention for the pad-tether connection.

FIG. 4 shows schematic illustrations of various T-pad configurations for the tether-pad connection. Skeleton connection is not shown. A single slab connection constitutes a continuous adhesive pad and support backing, which can then be divided into a larger number of discrete adhesive pads and support backings in which multiple tendons are used to create different configurations (e.g., a gradient length series configuration). The off edge tendon connection and center loaded pad configurations constitute an adhesive pad and support backing where a planar tether attached to the adhesive pad substantially at the center, where the length of the attachment can be equal to the width in the case of the T-pad or some fraction or the width in the case of the center loaded pad. In both cases the tether attached to the adhesive pad allows for adjustment of the angle between the planar tether and the adhesive pad from about 0° to about 359°.

Elastic materials that may be used in the adhesive pads include siloxane-based elastomers, urethane-based elastomers, and acrylate-based elastomers. Polydimethylsiloxane (PDMS) belongs to a group of polymeric organosilicon compounds that are commonly referred to as silicones. PDMS, widely used silicon-based organic polymer, has preferred rheological (or flow) properties. PDMS is generally inert, non-toxic and non-flammable.

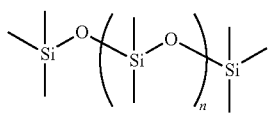

A Polydimethylsiloxane

Other elastic materials that may be used in the adhesive pads include polyurethanes, which are polymers of organic units covalently joined by urethane (carbamate) links.

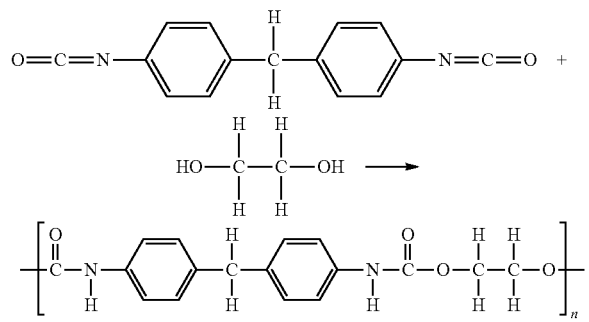

A Polyurethane

A urethane linkage is produced by reacting an isocyanate group, —N=C=O with a hydroxyl group, —OH. Polyurethanes are produced by the polyaddition reaction of a polyisocyanate with a polyalcohol (polyol) in the presence of a catalyst and other additives. In this case, a polyisocyanate is a molecule with two or more isocyanate functional groups, $R-(N=C=O)_n, \geq 2$ and a polyol is a molecule with two or more hydroxyl functional groups, $R'-(OH)_n, \geq 2$. The reaction product is a polymer containing the urethane linkage, —RNHCOOR'—. Examples of polyurethane monomers ("pre-polymers") includes hydroxyl ended molecules, such as polyethylene glycol, polypropylene glycol, poly tetramethylene glycol, or bisphenol A (hydroxyl-containing monomers) and an aliphatic or aromatic based isocyanate, such as methylene diphenyl diisocyanate, toluene diphenyl diisocyanate, hexamethylene diisocyanate, isophorone diisocyanate, or a polyisocyanate resulting from the combination of multiple of these monomers (for example, three molecules of methylene diphenyl diisocyanate form a trimer which contains three isocyanate functional groups).

In one aspect, the invention generally relates to a releasable, surface-adhesive device. The device includes an adhesive pad and a tether component attached to the adhesive pad. The adhesive pad includes: a planar backing layer having high in-plane stiffness; and a planar layer of an elastic material having an adhesive surface on at least one side for adhering to a target surface, wherein the elastic material is impregnated onto the backing layer on at least the side opposing the adhesive surface. In certain preferred embodiment, the device further comprises a holding component for load bearing. The holding component being attachable to the tether component for connecting an object to the device.

It is noted that the term "backing", as used herein, includes but is not limited to the situation where the referred to layer or material is the back (or the last) layer of the device structure. According to this invention, a backing layer may be an interior layer or component of a structural arrangement.

In certain embodiments, the adhesive pad includes: a planar layer of an elastic material having an adhesive surface on one side for adhering to a target surface; and a planar backing layer having high in-plane stiffness, wherein the backing layer is impregnated onto the layer of the elastic material on the side opposing the adhesive surface.

In certain embodiments, the adhesive surface is microscopically smooth. In certain embodiments, the adhesive surface is microscopically patterned.

In certain embodiments, the backing layer is a fabric backing layer.

In certain embodiments, the elastic material has a adhesive surface area from about 0.01 cm² to about 1,000 cm² (e.g., about 0.01 cm², 0.05 cm², 0.1 cm², 0.5 cm², 1 cm², 2 cm², 5 cm², 10 cm², 20 cm², 50 cm², 100 cm², 200 cm², 500 cm², 1,000 cm²) and a substantially uniform thickness from about 0.001 cm to about 0.1 cm. In certain embodiments, the planar layer of the elastic material has a smooth adhesive surface area of greater than about 0.01 cm² and has a substantially uniform thickness of less than about 0.001 cm. In certain embodiments, the planar layer of the elastic material has a smooth adhesive surface area of greater than about 0.05 cm² and has a substantially uniform thickness of less than about 0.005 cm. In certain embodiments, the planar layer of the elastic material has a smooth adhesive surface area of greater than about 0.1 cm² and has a substantially uniform thickness of less than about 0.01 cm. In certain embodiments, the planar layer of the elastic material has a smooth adhesive surface area of greater than about 0.2 cm² and has a substantially uniform thickness of less than about 0.5 cm. In certain embodiments, the planar layer of the elastic material has a smooth adhesive surface area of greater than about 0.5 cm² and has a substantially uniform thickness of less than about 0.2 cm. In certain embodiments, the planar layer of the elastic material has a smooth adhesive surface area of greater than about 1.0 cm² and has a substantially uniform thickness of less than about 0.1 cm. In certain embodiments, the planar layer of the elastic material has a smooth adhesive surface area of greater than about 5.0 cm² and has a substantially uniform thickness of less than about 0.05 cm. In certain embodiments, the planar layer of the elastic material has a smooth adhesive surface area of greater than about 10 cm² and has a substantially uniform thickness of less than about 0.02 cm. In certain embodiments, the planar layer of the elastic material has a smooth adhesive surface area of greater than about 100 cm² and has a substantially uniform thickness of less than about 0.01 cm. In certain embodiments, the planar layer of the elastic material has a smooth adhesive surface area from about 10 cm² to about 100 cm² and has a substantially uniform thickness from about 0.01 cm to about 0.05 cm. In certain embodiments, the planar layer of the elastic material has a smooth adhesive surface area from about 1,000 cm² to about 100 cm² and has a substantially uniform thickness from about 0.5 cm to about 0.05 cm.

In certain embodiments, the elastic material has an elasticity from about 0.05 MPa to about 50 MPa. In certain embodiments, the elastic material has an elasticity from about 0.05 MPa to about 30 MPa. In certain embodiments, the elastic material has an elasticity from about 0.05 MPa to about 10 MPa. In certain embodiments, the elastic material has an elasticity from about 1 MPa to about 50 MPa. In certain embodiments, the elastic material has an elasticity from about 1 MPa to about 30 MPa. In certain embodiments, the elastic material has an elasticity from about 1 MPa to about 10 MPa.

In certain embodiments, the elastic material includes a siloxane-based elastomer. In certain embodiments, the elastic material includes a urethane-based elastomer. In certain embodiments, the elastic material includes an acrylate-based elastomers. In certain preferred embodiments, the elastic material includes polydimethylsiloxane (PDMS). In certain embodiments, the elastic material includes a polyurethane, for example, prepared from polymerization of a hydroxyl ended polyethylene glycol with an aliphatic or aromatic based polyisocyanate. Any suitable materials may be used including styrene-butadiene-styrene elastomers and other thermoreversible block copolymer elastomers; liquid crystalline elastomers; natural rubber.

In certain embodiments, the material of the fabric backing layer includes a natural fabric material or a synthetic fabric material. In certain embodiments, the material of the fabric backing layer includes a natural fabric material such as cotton, hemp, wool, silk, bamboo string, cellulose, jute or pina. In certain embodiments, the material of the fabric backing layer includes a synthetic fabric of polyester, spandex, nylon, carbon fiber, polyaramid, carbon fiber polyaramid hybrid, carbon fiber basalt hybrid, fiberglass, or fiberglass hybrid. In certain preferred embodiments, the material of the fabric backing layer comprises a material selected from the group consisting of nylon, carbon fiber, polyaramid, carbon fiber and polyaramid hybrid.

In certain embodiments, the device has an adhesive surface area of 100 cm² or greater and capable of bearing a weight or at least 1200 N per 100 cm² of adhesive surface area. In certain embodiments, the device has an adhesive surface area of 100 cm² or greater and capable of bearing a weight of at least 3150 N per 100 cm² of adhesive surface area. In certain embodiments, the device has an adhesive surface area of 1 cm² or greater and capable of bearing a weight of at least 12.0 N per 1 cm² of adhesive surface area.

In certain embodiments, the device has an adhesive surface area of 1 cm² or greater and capable of bearing a weight of at least 31.5 N per 1 cm² of adhesive surface area.

In certain embodiments, the tether is a fabric material, for example, selected from synthetic fabrics like polyester, spandex, nylon, carbon fiber, polyaramid, carbon fiber polyaramid hybrid, carbon fiber basalt hybrid, fiberglass, carbon fiber, or fiberglass hybrid, and natural fabrics including cotton, hemp, wool, silk, bamboo string, cellulose, jute, and pina. In certain embodiments, the tether is a non-fabric material, for example, selected from leather, metal sheets, plastic sheets, or non-woven textiles. In some embodiments, the material is made from chain-link meshes.

In another aspect, the invention generally relates to a releasable, surface-adhesive device. The device includes: a planar layer comprising an elastic material and having on one side an adhesive surface for adhering to a target surface and on the other side a backing layer having high in-plane stiffness, wherein the elastic material impregnating into the backing layer; and a holding component attachable to the backing layer for connecting an object to the device. A portion of the backing layer extends beyond the layer of the elastic material to form an area of the backing layer un-impregnated with the elastic material, and the holding component attaches to the backing layer at such area of the backing layer un-impregnated with the elastic material.

In certain embodiment, the elastic material can extend beyond the fabric layer on the "back side" of the pad. This design may aid the establishment of uniform contact without sacrificing the stiffness of the device that is directly related to the force capacity of the adhesive device.

In yet another aspect, the invention generally relates to a releasable, reusable surface-adhesive device. The device includes an adhesive pad that has: a planar layer of an elastic material having an adhesive surface on one side for adhering to a target surface; and a planar backing layer having high in-plane stiffness, wherein the backing layer is impregnated onto the layer of the elastic material on the side opposing the smooth adhesive surface. The device further includes a tether attached to the adhesive pad substantially at the center of the adhesive pad and allowing adjustment of the angle between the planar tether and the adhesive pad from about 0° to about 359°.

In certain embodiments, the adjustable angle between the tether and the adhesive pad range from about 0° to about 90°, for example, 15°, 30°, 45°, or 60°. In certain other embodiments, the adjustable angle between the tether and the adhesive pad range from about 90° to about 120°, for example, 95°, 110°, 110°, or 115°. In certain other embodiments, the adjustable angle between the tether and the adhesive pad range from about 120° to about 360°, for example, 150°, 180°, 210°, 270° or 300°.

In yet another aspect, the invention generally relates to a releasable, surface-adhesive device. The device includes an adhesive pad, which has a planar layer of an elastic material having a microscopically smooth or patterned adhesive surface on one side for adhering to a target surface; and a planar fabric backing layer having high in-plane stiffness, wherein the backing layer is impregnated onto the layer of the elastic material on the side opposing the adhesive surface. The device further includes a tether component attached to the adhesive pad; and a holding component for load bearing, the holding component being attachable to the tether component for connecting an object to the device.

In yet another aspect, the invention generally relates to a method for releasably holding a weight on a surface. The method includes: (a) providing a releasable, surface-adhesive device having an adhesive pad comprising a planar layer of an elastic material having a microscopically smooth adhesive surface on one side for adhering to a target surface; and a planar fabric backing layer having high in-plane stiffness, wherein the fabric backing layer is impregnated onto the layer of the elastic material on the side opposing the smooth surface; a fabric tether attached to the adhesive pad; and a holding component for load bearing attachable to the fabric tether for connecting an object to the device; and (b) attaching the weight to the holding component.

In yet another aspect, the invention relates to a method for making a releasable, surface-adhesive device. The method includes: (a) providing an elastic material; (b) providing a fabric backing sheet; (c) curing the elastic material to impregnate the elastic material into at least a portion of the fabric backing sheet to form a pad having a layer of the elastic material with a smooth adhesive surface; (d) attaching a weight-holding component to the fabric backing sheet. The elastic material has an elasticity from about 0.05 MPa to about 50 MPa, and the layer of the elastic material has a thickness from about 0.0001 cm to about 0.1 cm.

In yet another aspect, the invention generally relates to a method for making a releasable, surface-adhesive device. The method includes: (a) providing a fabric backing sheet, on one side of which is placed a substrate layer; (b) providing, on the other side of the fabric backing sheet, a spacer-defined molding area; (c) adding an elastic material into the spacer-defined molding area of the fabric backing sheet; (d) covering the elastic material with a top cover having a microscopically smooth or patterned surface; (e) applying pressure against the top cover causing an intimate interface between the top pad and the elastic material; (f) curing the elastic material to impregnate the elastic material into at least a portion of the fabric backing sheet to form a pad having a layer of the elastic material with a microscopically smooth or patterned adhesive surface; and (g) attaching a weight-holding component to the fabric backing sheet. The elastic material has an elasticity from about 0.05 MPa to about 50 MPa, and the layer of the elastic material has a thickness from about 0.0001 cm to about 0.1 cm.

In certain embodiments, the ratio of storage to loss elastic moduli is at least greater than about 10 (e.g., greater than 15, 20, or 50) at the operating temperature of interest.

The layer of the elastic material may have any size and shape as a particular application requires, for example, it may have a substantially circular outer boundary, a substantially rectangular outer boundary, a substantially elliptical outer boundary, or a substantially irregular outer boundary.

As stated herein, in some embodiments, the layer of an elastic material includes two, three, four or more separate smaller elastic material layer units or structures. The target surface may be any suitable surfaces, including that of glass, metal, wood, plastic, paper, cardboard, or concrete.

Repeated attachment and release of loads has been demonstrated under pure shear and normal loading directions, as well as controlled peel angles, with magnitudes of performance unmatched by any existing products to our knowledge. For example, an experimental device was able to support loads as great as 707 pounds with a 16 square inch T-pad (44 psi), with minimal force required for detachment, a performance repeated on the same pad for numerous cycles with negligible degradation in performance. Additionally, an adhesive pad structure can be easily cleaned with soap and water or a particle transfer material, such as a viscoelastic, acrylic tape. The release mechanism may be designed according to the principles disclosed herein to fit particular applications.

The integrated adhesive pad approach of the invention provides a robust platform for a wide-variety of applications. For example, these structures can be used to support shelving for books, displays, and electronic appliances (televisions, computers, stereos, monitors, screens); hanging structures; auto trims; among others. Furthermore, the current designs can be used to facilitate climbing on vertical surfaces or overhangs that are made from a variety of materials, such as glass, metal, wood, and drywall.

EXAMPLES

Force Vs. Displacement Tests

Figure 5:
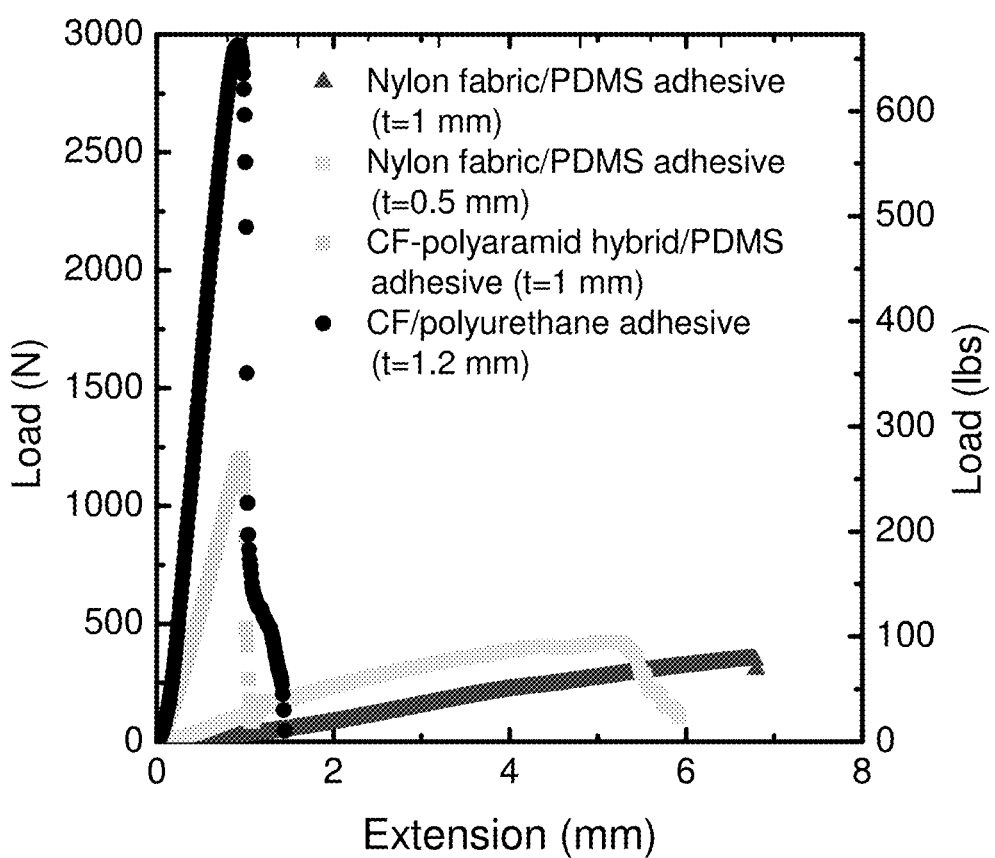
FIG. 5 shows exemplary force vs. displacement measurements for characterizing maximum force supported under pure shear loading for "T-pad" structures.

FIG. 5 shows exemplary force vs. displacement measurements for characterizing maximum force supported under pure shear loading for T-pad structures. (Fabric backing varied. All results were for 16 $in^2$ pad with varying thicknesses labeled as 't' in the legend.) The experiments were run on an Instron testing machine in a single lab joint geometry where attachment was made between the adhesive pad and a smooth clean glass substrate. The extension was controlled to be 10 mm/min and the load was measured throughout the test. The maximum load corresponds to the critical failure load, which varies depending on fabric backing as shown.

Figure 6:
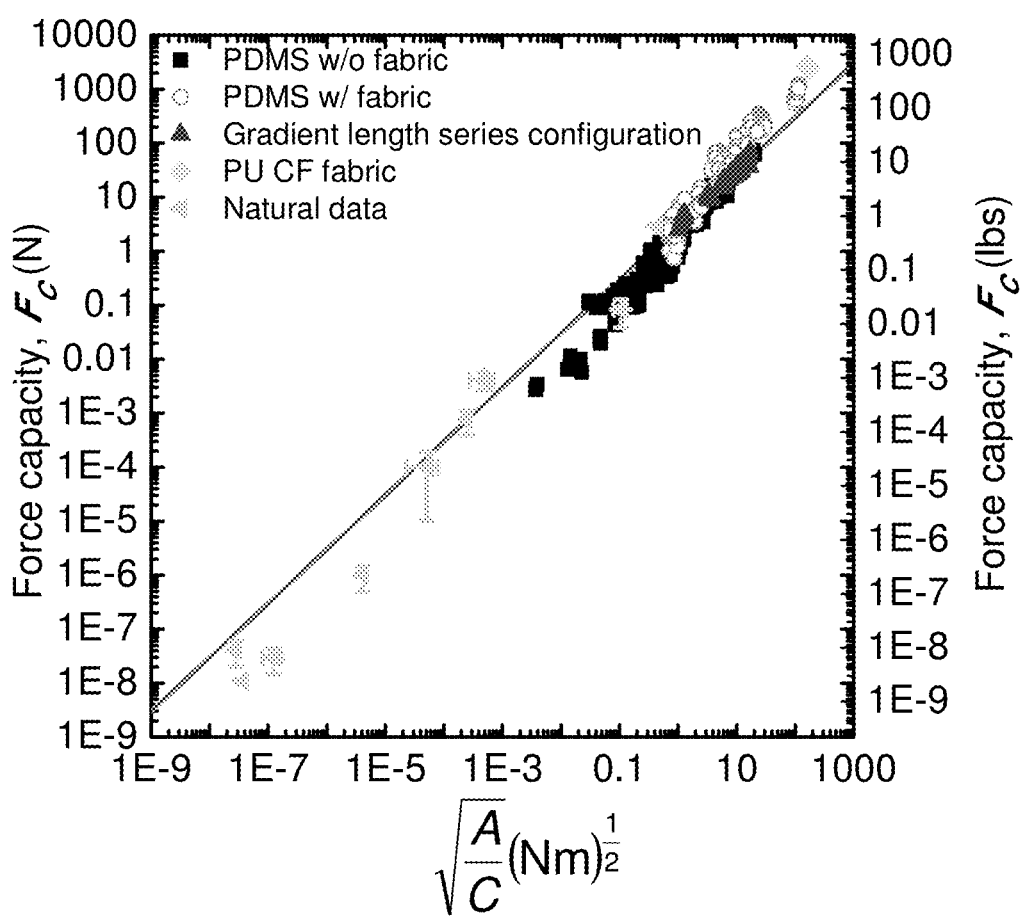
FIG. 6 shows exemplary maximum shear force supported for various "T-pad" configurations, live geckos, and non-fabric backed polymer coatings as a function of the square root of interfacial area normalized by in-plane compliance.

FIG. 6 shows maximum shear force supported for various T-pad configurations, natural data (which includes live geckos and various attachment devices for geckos, beetles, spiders, crickets, and flys), and non-fabric backed polymer coatings as a function of the square root of interfacial area normalized by in-plane compliance. Trend line follows predicted scaling relationship demonstrating ability to predictably tune maximum shear force performance.

Failure Force Tests

Figure 7:
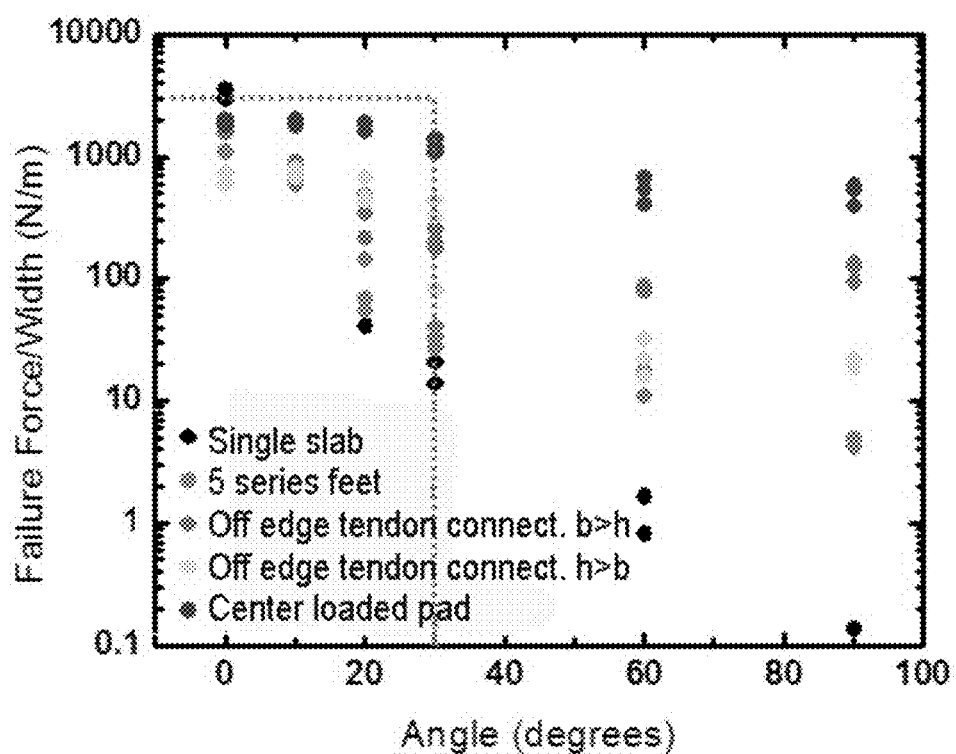
FIG. 7 shows exemplary failure force per unit width as a function of peel angle for various "T-pad" configurations.

FIG. 7 shows failure force per unit width as a function of peel angle for different T-pad configurations (total contact area for each adhesive pad is 10.8 $cm^2$, and the center loaded pad connection is ⅔ the width). Demonstrating ability to tune critical angle for easy release. Peel experiments were conducted on an Instron 5500 R on clean glass at 10 mm/min, and the angle between the applied load and substrate was varied between 0° and 90°.

Figure 8:
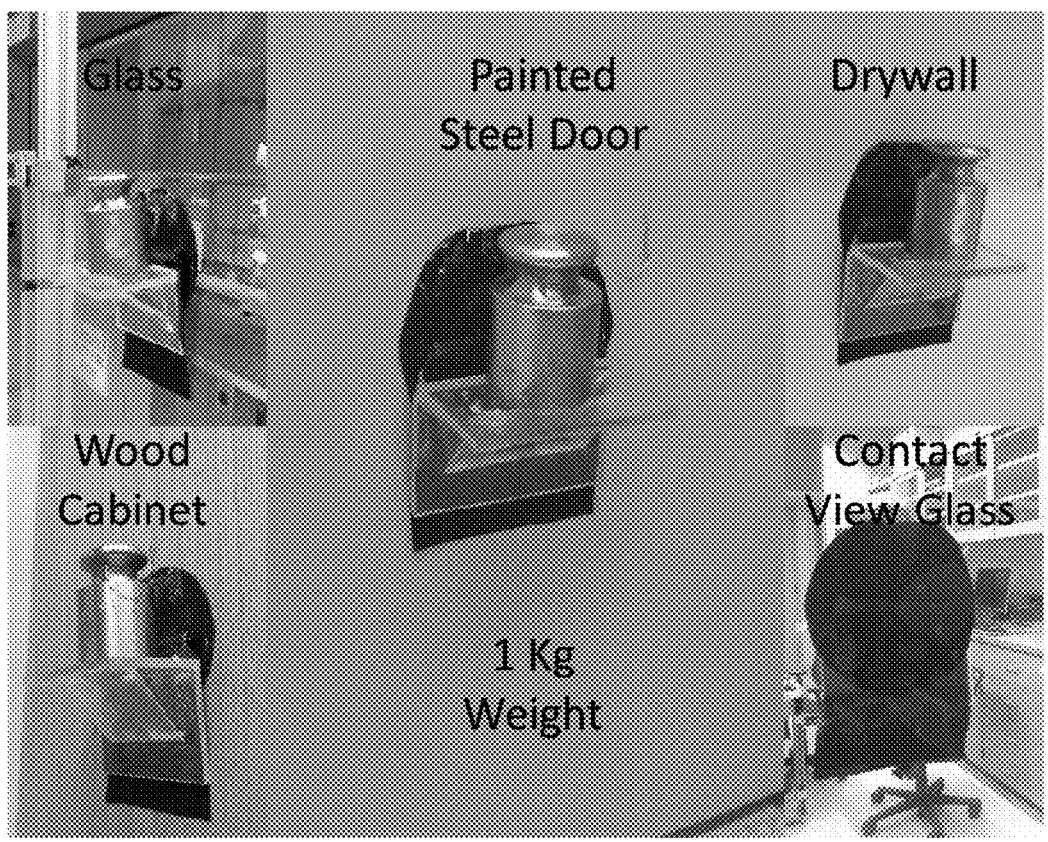
FIG. 8 shows certain examples of complete "T-Pad" structures supporting loads on various surfaces.

FIG. 8 shows some simple examples of complete T-Pad structure to support loads on various surfaces. The same nylon fabric PDMS adhesive (A=16 $in^2$ with thickness of 1 mm) pad structure is used in all examples.

Fabrication of PDMS Adhesive Pads

Figure 9:
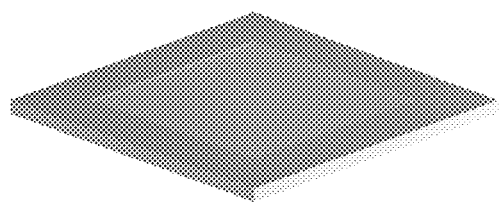
FIG. 9 schematically illustrates an exemplary embodiment of fabrication of adhesive pads according to the invention.
Figure 9:
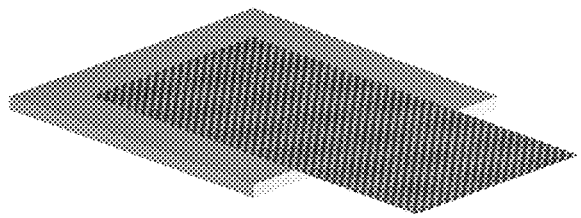
Figure 9:
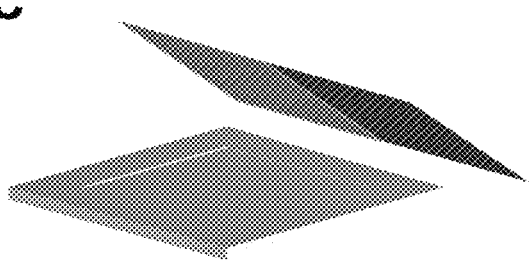

FIG. 9 schematically illustrates an embodiment of fabrication of PDMS adhesive pads. (A) To prepare PDMS adhesives, molds were fabricated using glass slides. Uncured, degassed PDMS oligomer and curing agent (Dow Corning Sylgard 184™) 10:1 ratio (w/w) were poured into the mold. The mold was constructed such that its thickness was greater than the roughness of the fabric, which allowed for a smooth surface finish on the adhesive after fabrication. After the degassed PDMS was poured and allowed to spread into the mold, a 6-8 minute pre-cure at 70° C. was performed before the application of the fabric to help support the fabric during the subsequent cure. (B) Fabric was then placed over the mold allowing the uncured PDMS to impregnate the fabric, and was then cured at room temperature for 3 days. The fabric consisted of a single piece that was cut so that the width overlaps the edges of the mold to provide support, and the length was sufficiently long to cover the mold and create the "tendon" structure. The tendon can also be impregnated with elastomer to provide for equal load sharing.

In another embodiment, the fabric was designed to be a center loaded pad, such that a fabric tendon was stitched to the center of the adhesive pad fabric. In this scheme, the tendon structure was also impregnated with PDMS to ensure that the fabric did not unravel during subsequent load application. This was achieved by placing one separator sheet between the tendon and the adhesive pad, then spreading PDMS across the tendon, followed by placing a capping separator sheet on top of the impregnated tendon. (C) After the PDMS was cured, the fabric adhesive was removed from the mold and mechanically cut to size. A rigid mount ("skeleton") consisting of 2⅛" thick plastic sheets were attached to the bottom of the tendon using cyanoacrylate adhesive, which was then allowed to cure for 6 hours.

Figure 10:
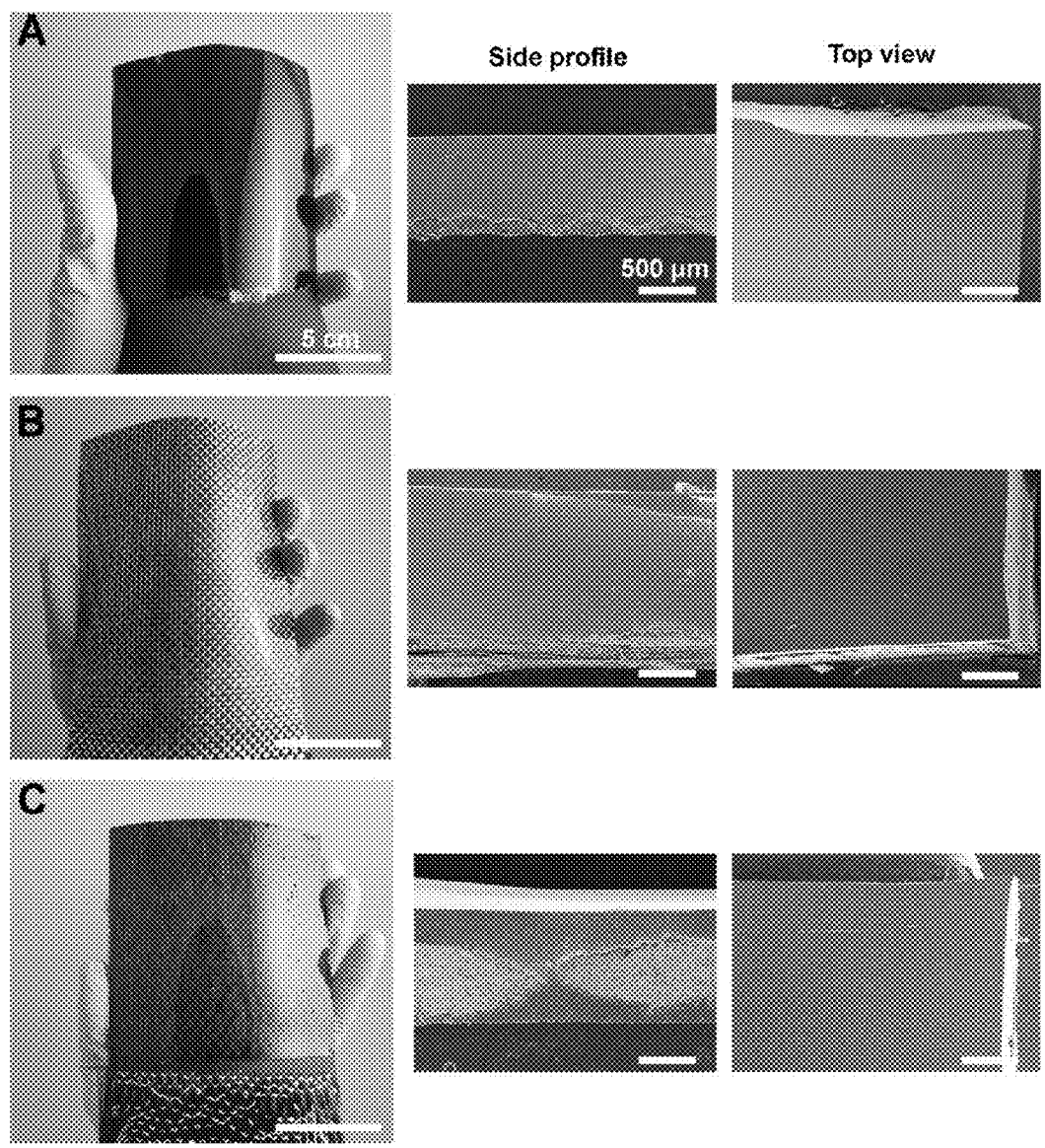
FIG. 10 shows exemplary images of fabric adhesives. (A) A nylon fabric PDMS adhesive, (B) A carbon fiber/Kevlar plain weave fabric PDMS adhesive, and (C) a unidirectional carbon fiber polyurethane adhesive.

FIG. 10 shows exemplary images of: (A) a photograph of a nylon fabric PDMS adhesive, (B) a carbon fiber/Kevlar plain weave fabric PDMS adhesive, and (C) an unidirectional carbon fiber polyurethane adhesive. The center column shows a scanning electron microscope (SEM) image of the side profile with the adhesive side facing up, and the right column shows the smooth adhesive surface. Scale bars in the optical photographs are 5 cm, and all scale bars in the SEM images are 500 μm.

Polyurethane Adhesives

Polyurethane adhesives have been synthesized by adding 1:1 ratio of functional groups of hydroxyl ended polyethylene glycol, polypropylene glycol, and/or polytetramethylene glycol, with either aliphatic or aromatic based polyisocyanates. Commercial kits of polyurethanes have also been utilized in this application.

Figure 11:
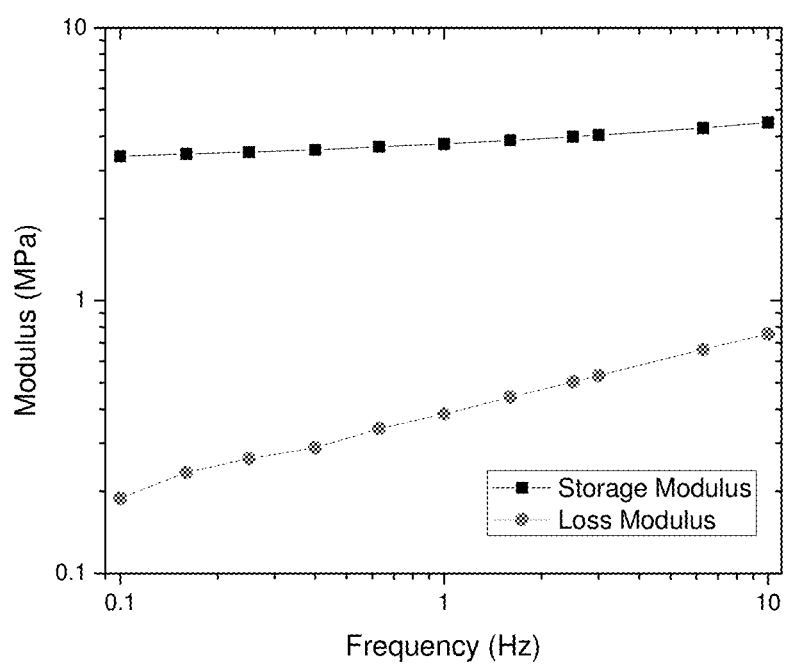
FIG. 11 shows exemplary plot of modulus against frequency for an example of polyurethane.

FIG. 11 shows modulus is plotted against frequency for an example of polyurethane. The storage modulus is about an order of magnitude greater than the loss modulus, showing that the sample has predominantly solid-like, elastic properties. The modulus also varies little over two orders of magnitude in frequency.

Figure 12:
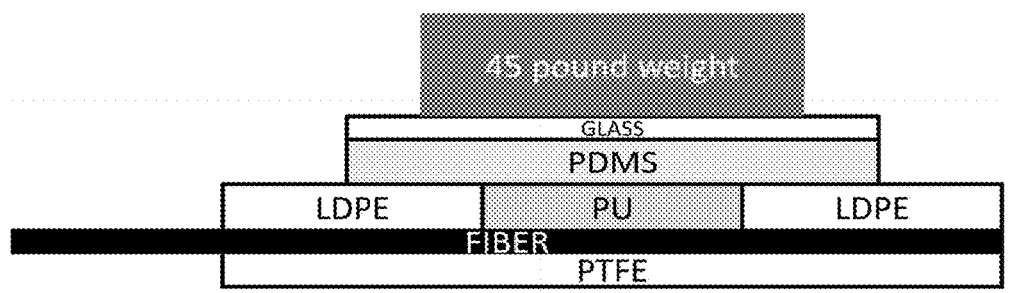
FIG. 12 shows schematic illustrations of an embodiment of the molding technique for fabricating an adhesive pad according to the invention.

FIG. 12 schematically illustrates an embodiment of the molding technique by which to form a pad with polyurethane. On top of a polytetrafluoroethylene substrate fiber was placed for the adhesive backing layer. A low-density polyethylene (LDPE) spacer was placed on top of the fiber that allows for controlling polyurethane (PU) thickness, and uncured PU prepolymer was poured into the mold. A polydimethylsiloxane pad was then placed on top with a glass plate, and finally the system was weighted with a 45 pound weight.

Utilizing this molding technique, a smooth adhesive surface (utilizing a smooth PDMS top layer), or surface features (utilizing a patterned PDMS top layer) can be achieved. The thickness of the adhesive can be changed by modifying the thickness of the LDPE spacer. This method may also be altered to work using a doctor blade system, which would allow for mass production of adhesive pads.

Loading Tests

Figure 13:
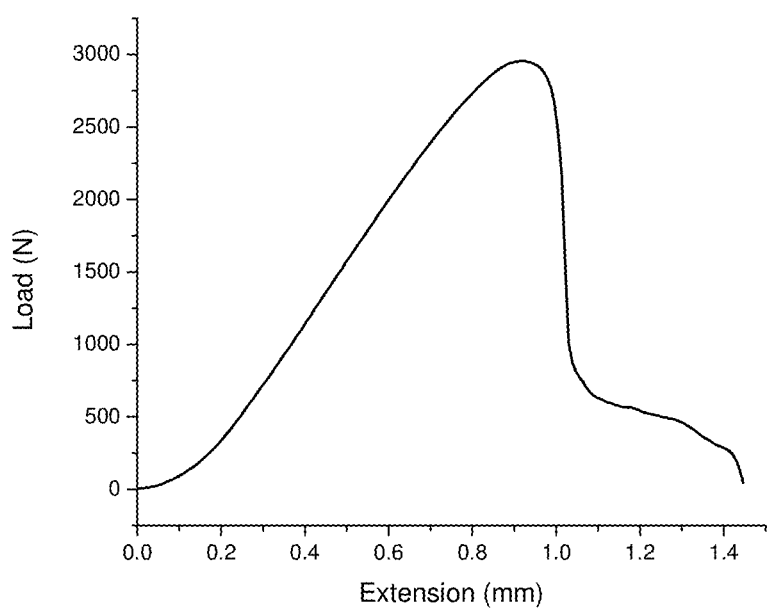
FIG. 13 shows exemplary results of a controlled displacement test (load plotted against extension).
Figure 14:
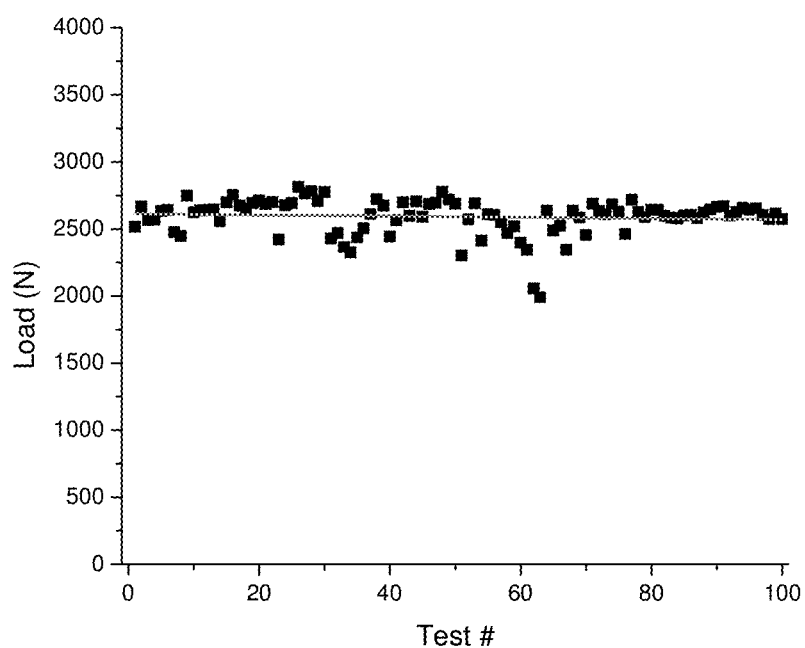
FIG. 14 shows exemplary results of the repeatability of a polyurethane adhesive pad undergoing cyclic loading.

Sample adhesive pads were tested using an Instron controlled displacement test. Mechanical grips were attached to an Instron 5500 R, with a pane of glass attached to the grip on the crosshead, and the adhesive pad secured to the bottom grip. The adhesive pad was then adhered to the glass, and a displacement of 10 mm/min was used until the adhesive detached from the glass. This test was repeated multiple times to determine the average failure force, and prove reusability. FIG. 13 shows that there is an initial loading regime, and by finding the slope of this line one can find the stiffness of the adhesive system that controls the total capacity of the adhesive. The stiffness (and therefore, total capacity) for these polyurethane adhesives is greater than previously recorded values of stiffness. At the peak of this curve is the total capacity (2950 N for this sample). After this peak the adhesive releases from the glass, resulting in a drop in the registered load. This test can be repeated, and we have shown good reproducibility over 100 cycles of testing (FIG. 14).

Figure 15:
FIG. 15 shows static load test performed with polyurethane adhesives holding 136 kg.

Static load testing was also performed on these polyurethane adhesives. A bar containing 136 kg of mass was connected via chain to an adhesive pad, and was also supported by a pulley system. Using the pulley system, the weights were raised until the adhesive could be adhered to the glass adherend setup. The pulley system was then lowered until the total load was supported by the adhesive. Certain results of such tests are shown in FIG. 15, wherein the tests were performed by holding 136 kg on glass surfaces.

Figure 16:
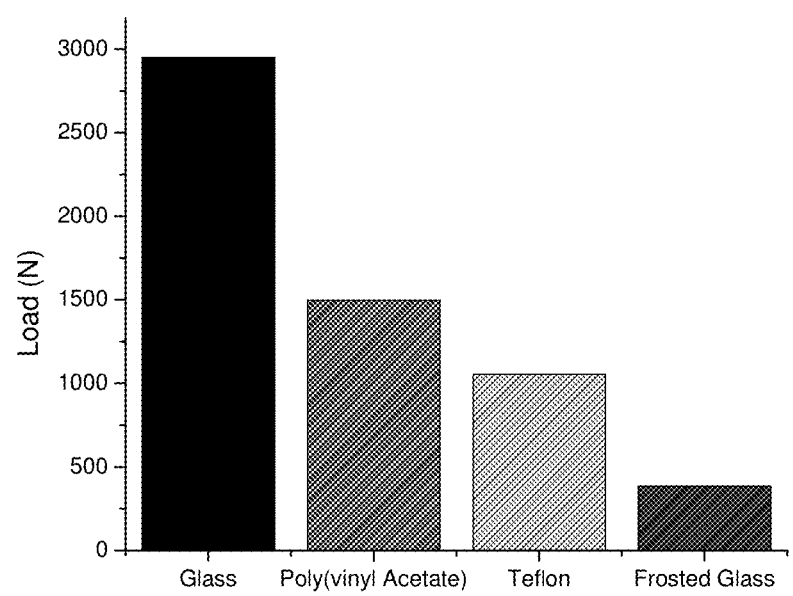
FIG. 16 shows exemplary load data from polyurethane adhesives with a variety of substrates.
Figure 17:
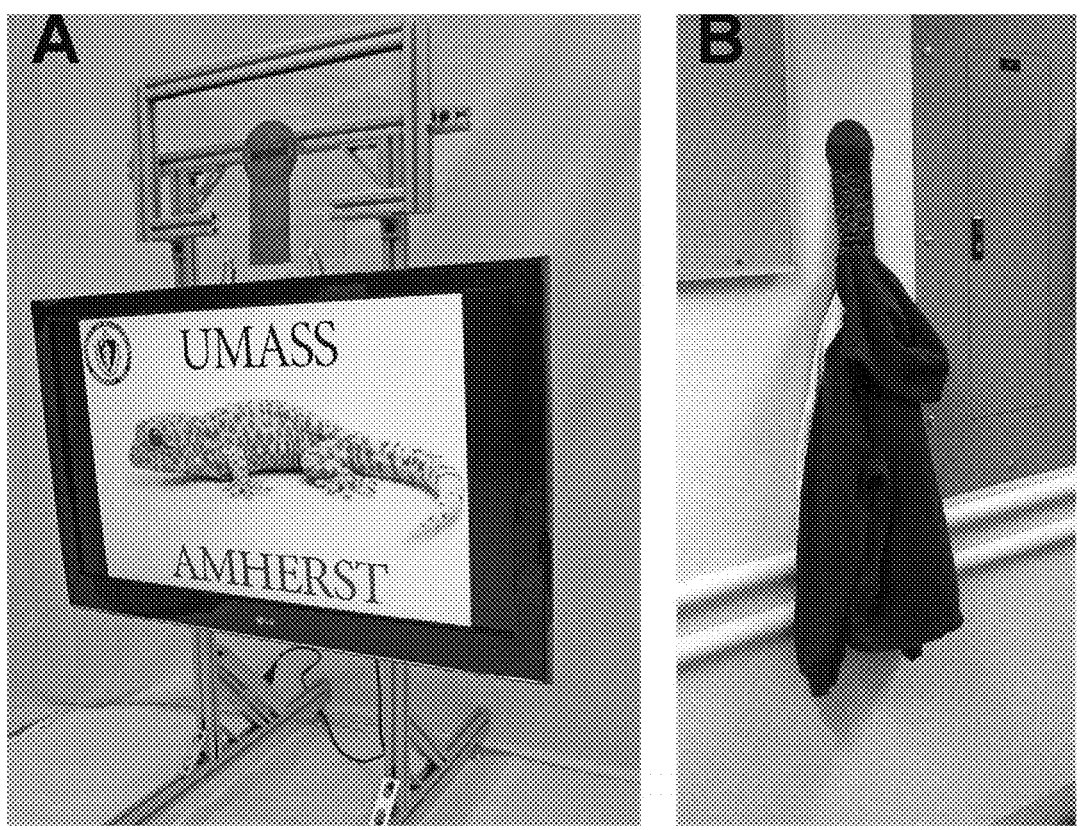
FIG. 17 shows the static load test performed on (A) a center loaded PDMS adhesive pad holding a 42" flat panel television and (B) a center loaded polyurethane adhesive pad holding a hooded sweatshirt on drywall.
Figure 18:
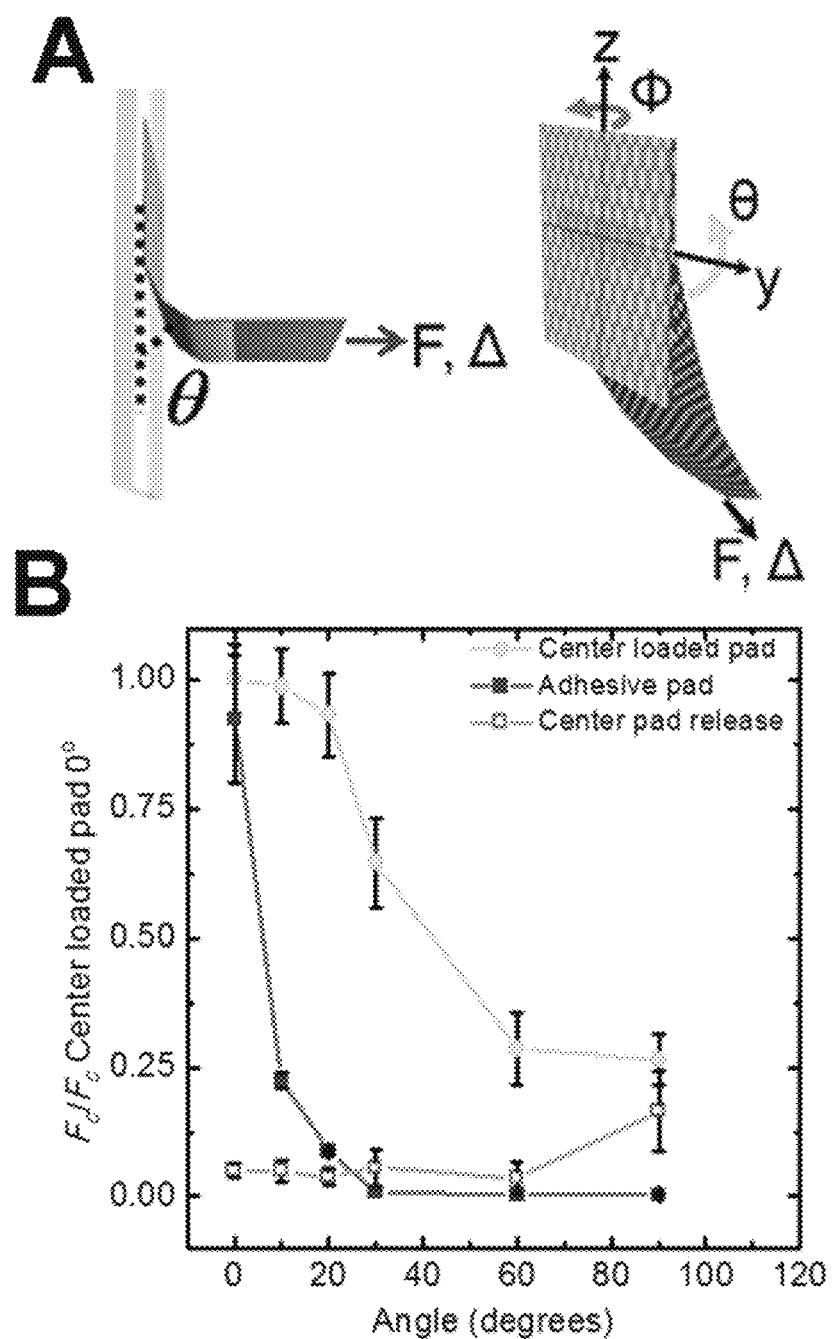
FIG. 18 (A) shows schematic illustrations of the loading angle dependence for the high capacity and easy release adhesive pads. (B) Shows exemplary results of the angle dependence of the center loaded pad compared to a single slab adhesive pad, where the center loaded pad maintains a high failure force throughout various loading angles, while still allowing for easy release.

As shown in FIG. 16, these polyurethane adhesives can be used on a variety of substrates. These results were performed similarly to previous loading tests, however, the glass pane was either replaced with a new material, or a new material was adhered to the surface of a glass pane. FIG. 17 shows the static load test performed on (A) a 16 in$^2$ center loaded PDMS adhesive pad holding a 42" flat panel television and (B) a center loaded polyurethane adhesive pad holding a hooded sweatshirt on drywall. FIG. 18 (A) shows schematic illustrations of the loading angle dependence for the high capacity and easy release adhesive pads. (B) Shows results of the angle dependence of the center loaded pad compared to a single slab adhesive pad, where the center loaded pad maintains a high failure force throughout various loading angles, while still allowing for easy release.

INCORPORATION BY REFERENCE

References and citations to other documents, such as patents, patent applications, patent publications, journals, books, papers, web contents, have been made in this disclosure. All such documents are hereby incorporated herein by reference in their entirety for all purposes.

EQUIVALENTS

The representative examples are intended to help illustrate the invention, and are not intended to, nor should they be construed to, limit the scope of the invention. Indeed, various modifications of the invention and many further embodiments thereof, in addition to those shown and described herein, will become apparent to those skilled in the art from the full contents of this document, including the examples and the references to the scientific and patent literature included herein. The examples contain important additional information, exemplification and guidance that can be adapted to the practice of this invention in its various embodiments and equivalents thereof.

What is claimed is:
1. A releasable surface-adhesive device, comprising:
   an adhesive pad, comprising:
      a planar backing layer;
      a planar layer of an elastic material having an adhesive surface on at least one side for adhering to a target surface, wherein a side of the planar layer of the elastic material opposing the adhesive surface is applied onto the backing layer, and wherein the backing layer has a higher in-plane stiffness than the planar layer of the elastic material.

2. The releasable surface-adhesive device of claim 1, wherein the planar layer of the elastic material comprises two or more separate smaller elastic material layer units.

3. The releasable surface-adhesive device of claim 1, further comprising a flexible tether attached to and extending from the backing layer of the adhesive pad.

4. The releasable surface-adhesive device of claim 3, wherein an angle between the tether and the adhesive pad is adjustable.

5. The releasable surface-adhesive device of claim 3, further comprising a holding component attached to the tether for connecting an object to the device.

6. The releasable surface-adhesive device of claim 3, wherein the tether comprises at least one of fabric, rope, fiber, plastic sheet, tubing, rods, metal foil, chains, non-woven textile, cable, and leather.

7. The releasable surface-adhesive device of claim 3 wherein the tether is attached to the adhesive pad away from an edge of the adhesive pad.

8. The releasable surface-adhesive device of claim 3, wherein the tether is attached to the adhesive pad at the center of the adhesive pad.

9. The releasable surface-adhesive device of claim 1, wherein the planar layer of the elastic material has a uniform thickness between 0.0001 cm to 0.1 cm.

10. The releasable surface-adhesive device of claim 9, wherein the elastic material has an elastic modulus between 0.05 MPa to 50 MPa.

11. The releasable surface-adhesive device of claim 10, wherein the elastic material comprises at least one of a siloxane-based elastomer, an urethane-based elastomer, an acrylate-based elastomer, a polydimethylsiloxane (PDMS), a block copolymer elastomer, a polyurethane, styrene-butadiene-styrene, and a natural rubber.

12. The releasable surface-adhesive device of claim 11, wherein the backing layer comprises at least one of a fabric, foil, sheet, and film.

13. A method comprising:
    attaching a flexible tether to the adhesive pad of the releasable surface-adhesive device of claim 1.

* * * * *